United States Patent [19]

Ichiyanagi

[11] 4,041,362
[45] Aug. 9, 1977

[54] MOTOR CONTROL SYSTEM

[75] Inventor: Toshikazu Ichiyanagi, Tokyo, Japan

[73] Assignee: Canon Kabushiki Kaisha, Tokyo, Japan

[21] Appl. No.: 543,321

[22] Filed: Jan. 23, 1975

Related U.S. Application Data

[63] Continuation of Ser. No. 324,809, Jan. 18, 1973, abandoned, which is a continuation of Ser. No. 107,809, Jan. 19, 1971, abandoned.

[30] Foreign Application Priority Data

| Jan. 23, 1970 | Japan | 45-6145 |
| Mar. 13, 1970 | Japan | 45-21686 |
| Mar. 13, 1970 | Japan | 45-21687 |
| Apr. 3, 1970 | Japan | 45-28464 |
| Apr. 24, 1970 | Japan | 45-35187 |
| Nov. 14, 1970 | Japan | 45-100611 |
| Nov. 14, 1970 | Japan | 45-100612 |
| May 9, 1970 | Japan | 45-45265[U] |

[51] Int. Cl.$^2$ .................. G05B 5/00; H02K 27/20; H02P 5/00
[52] U.S. Cl. .................. 318/318; 318/328
[58] Field of Search .................. 318/314–328, 318/138; 307/291

[56] References Cited

U.S. PATENT DOCUMENTS

| 3,084,307 | 4/1963 | Landis | 318/328 X |
| 3,092,736 | 6/1963 | Ernyei | 307/291 X |
| 3,250,066 | 5/1966 | Engelhardt et al. | 307/291 X |
| 3,272,995 | 9/1966 | Alexander et al. | 307/291 X |
| 3,280,395 | 10/1966 | Madsen | 307/291 X |
| 3,287,569 | 11/1966 | Carney | 307/291 X |
| 3,447,007 | 5/1969 | Deaton | 318/328 |
| 3,531,704 | 9/1970 | Uemura et al. | 318/328 |
| 3,544,872 | 12/1970 | Rudolph et al. | 318/328 |
| 3,596,159 | 7/1971 | Kato | 318/328 X |
| 3,609,494 | 9/1971 | Takahashi et al. | 318/328 |
| 3,689,816 | 9/1972 | Matthey et al. | 318/327 |
| 3,710,220 | 1/1973 | Koch | 318/326 |
| 3,752,249 | 8/1973 | Gelenius et al. | 318/328 |
| 3,812,410 | 5/1974 | Schaub et al. | 318/328 |

Primary Examiner—James R. Scott
Attorney, Agent, or Firm—Toren, McGeady and Stanger

[57] ABSTRACT

In a drive system for driving an electric motor at a given rotational speed, an electric power source drives the motor. A switching arrangement connected in series with the power source applies discontinuous pulses to the electric motor. A signaler coupled to the motor has an output corresponding to the rotational speed of the motor and actuates an oscillator which produces pulse signals in response thereto. A threshold circuit responds to the pulse signals and to the signal generator and controls the switching arrangement. According to another arrangement, a bistable multivibrator is coupled to the motor and produces an output corresponding to the speed of the motor. A trigger then triggers a monostable multivibrator that produces pulses having times related to the desired speed of the motor. An AND gate responds to the two multivibrators and sets a flip-flop which is reset in response to the bistable multivibrator so that the flip-flop can drive driving means coupled to the motor for controlling the speed of the motor.

15 Claims, 39 Drawing Figures

FIG. 7
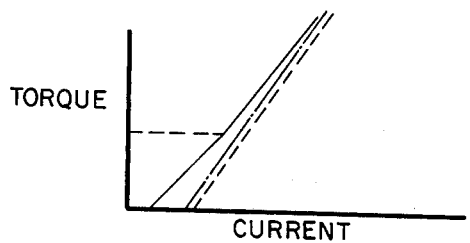
FIG. 8
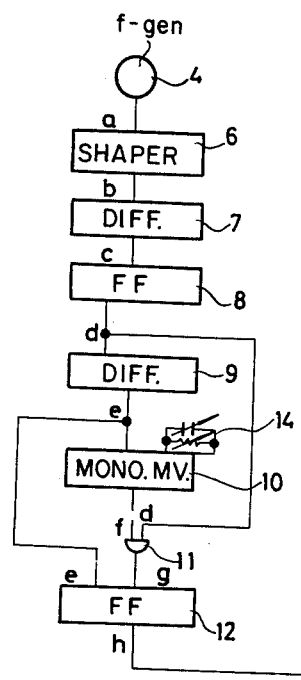
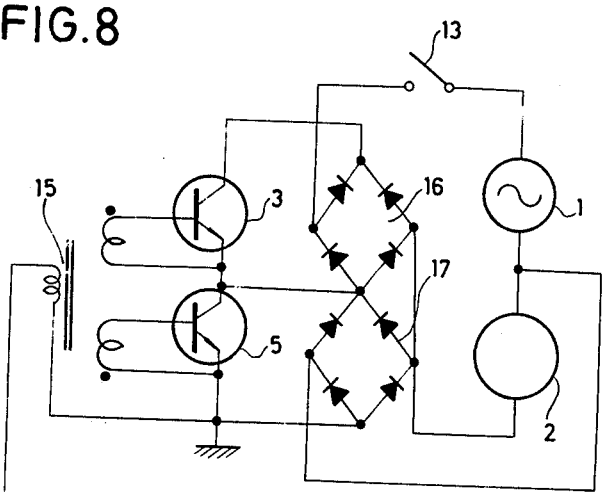
FIG. 9
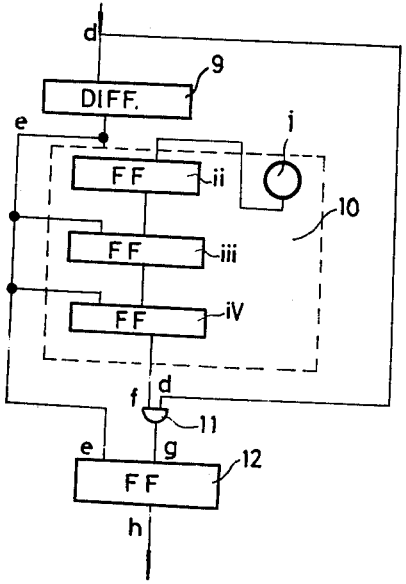

INVENTOR.
TOSHIKAZU ICHIYANAGI
BY Toren and McGeady
ATTORNEYS

INVENTOR.
TOSHIKAZU ICHIYANAGI
BY
Toren and McGeddy
ATTORNEYS

INVENTOR.
TOSHIKAZU ICHIYANAGI
BY
Toren and McGeady
ATTORNEYS

FIG.33
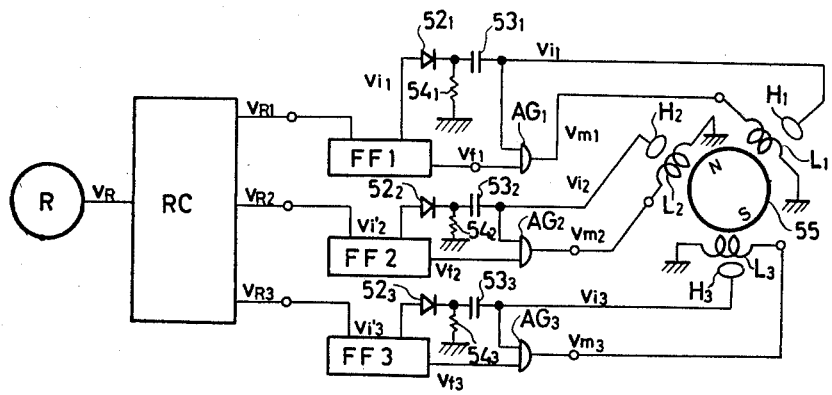
FIG.34-A
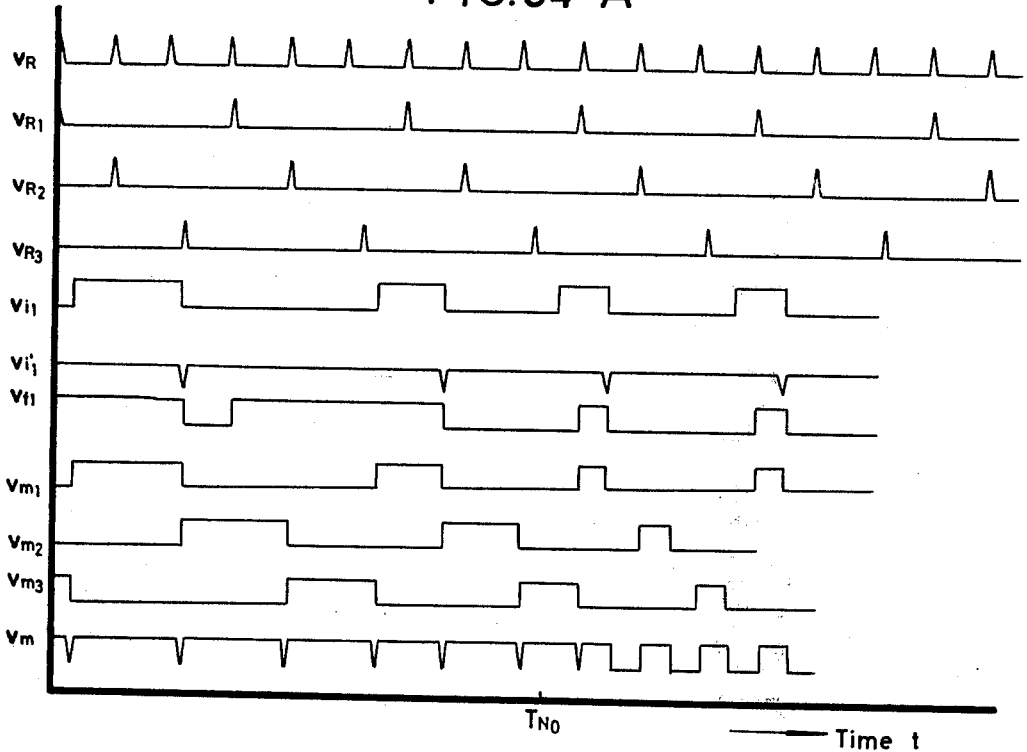
FIG.34-B
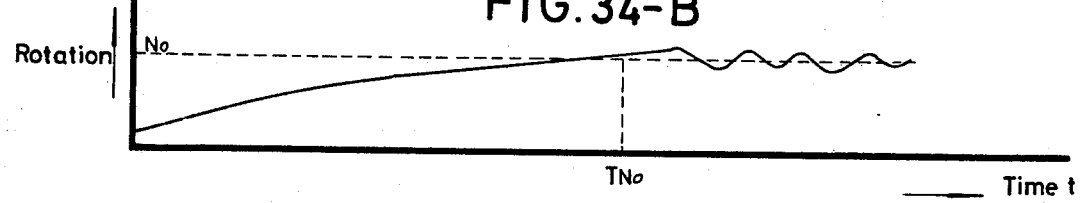

FIG. 37-A
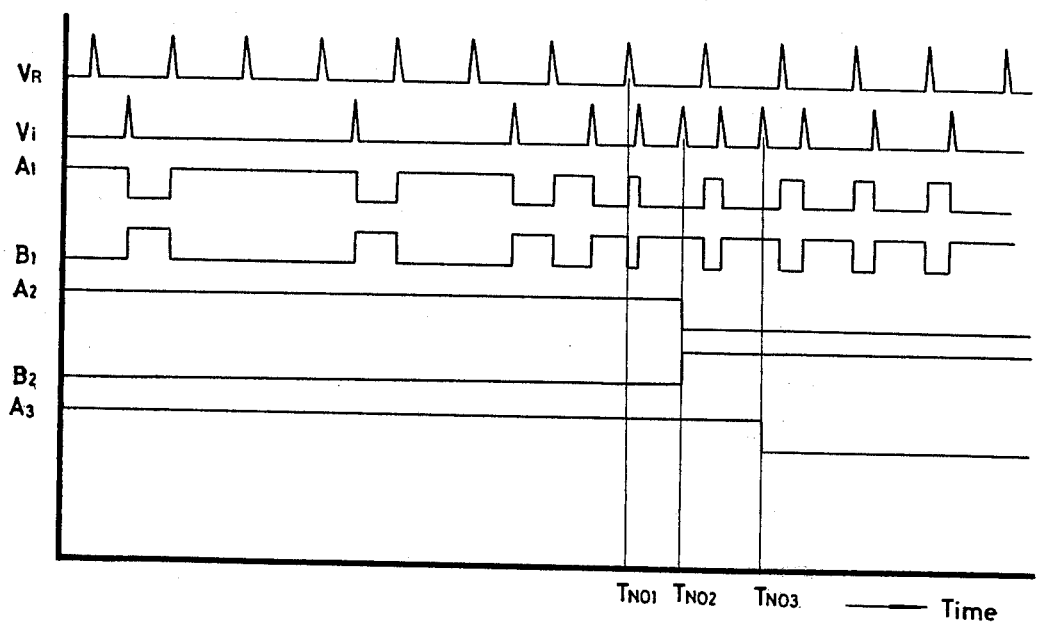
FIG. 37-B
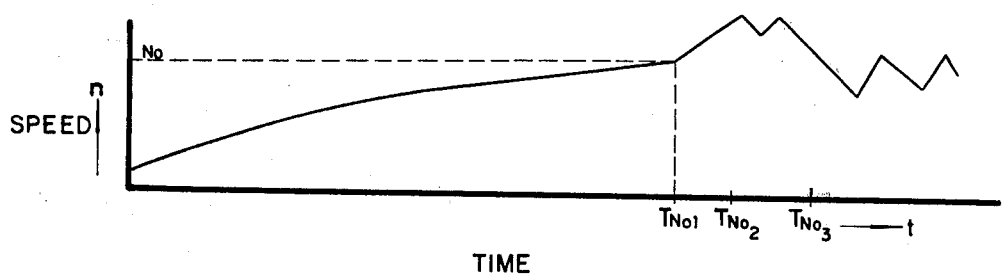
INVENTOR.
TOSHIKAZU ICHIYANAGI
BY Toren and McGrady
ATTORNEYS

MOTOR CONTROL SYSTEM

This is a continuation of application Ser. No. 324,809 filed Jan. 18, 1973, which in turn is a continuation of application Ser. No. 107,809 filed on Jan. 19, 1971, now abandoned.

BACKGROUND AND BRIEF SUMMARY OF THE INVENTION

The present invention relates to a control system, particularly to a control system for controlling an object to be controlled with an A.C. biased in-put supply to a switching element.

One of the objects of the present invention is to provide a control system with an A.C. biased in-put supply to a switching element which is characterized in that the system is constructed in such a manner that an object to be controlled is connected with the out-put a switching element of a bi-stable multi-vibrator, while to the in-put of the bi-stable multi-vibrator an A.C. biased in-put signal mixed with an A.C. signal presenting a higher frequency than that of an in-put signal is given.

Another object of the present invention is to use the above-mentioned control system for controlling rotation speed of a motor.

Features of the present invention lie in that the bi-stable multi-vibrator comprises a flip-flop circuit, that the bi-stable multi-vibrator comprises a Schmitt circuit, that the control system comprises a thermal compensator, that the control system comprises a compensating means for compensating variations in the power supplied to the system, that control system comprises a variable element for varying the mode of the control, and that the motor is an A.C. motor with A.C. supply as well as a D.C. motor with D.C. supply.

The main advantage of the present invention is that the power consumption is greatly reduced and a precise control of an object such as a motor is assured.

BRIEF DESCRIPTION OF THE DRAWINGS

Other objects, features and advantages of the present invention will be understood from the following descriptions in reference to the attached drawings in which:

FIGS. 6 and 7 show characteristics-graphs to explain the operation of the control system for the first embodiment shown in FIG. 3.

FIGS. 8 and 9 show modifications of the first embodiment shown in FIG. 3.

FIG. 33 shows a schematic circuit diagram of a fourth embodiment of a direct current synchronous motor according to the present invention.

FIG. 34-A shows wave forms at each part of the electric circuit shown in FIG. 33.

FIG. 34-B shows the rotation speed characteristics of the direct current synchronous motor shown in FIG. 33.

FIG. 37-A shows wave forms of the signals at each part of the circuit shown in FIG. 36.

FIG. 37-B shows the rotation speed characteristics of the motor shown in FIG. 36.

DESCRIPTION OF THE PREFERRED EMBODIMENTS

Figure 1:
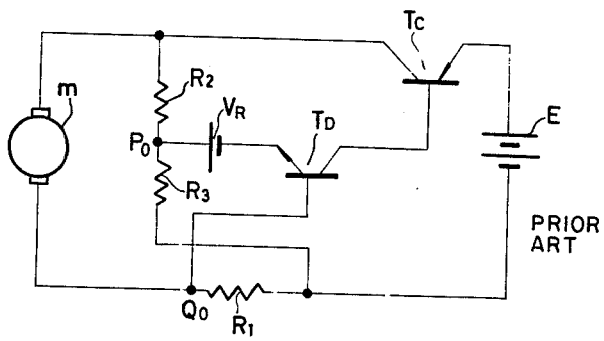
FIG. 1 shows an electric wiring diagram of a conventional system to control a D.C. motor to run at a constant speed.

One of the conventional methods to electrically controlling the speed of a D.C. motor is to apply the counter-electromotive force of the motor to be controled as shown in FIG. 1. In FIG. 1, m is a D.C. motor to be controled, and E is an electric source. This D.C. motor m composes a bridge circuit together with resistors $R_{1'}$, $R_{2'}$ and $R_{3'}$. Supposing that the equivalent value of internal resistance of the D.C. motor $m$ is $R_a$, that of $R_{1'}$ be $R_1$, that of $R_{2'}$ be $R_2$ and that of $R_{3'}$ be $R_3$, the voltage between the terminals $P_o$ and $Q_o$ of the detecting bridge depends exclusively upon the rotation speed and not upon the load torque, in case the bridge balance condition is established; namely $$R_a/R_1 = R_2/R_3$$

In consequence, the above-mentioned voltage between terminals of the detecting bridge is detected by a transistor $T_D$ comparing a reference voltage $V_R$, whereby the difference between above both voltages is amplified and used to control a transistor $T_c$ in order to control the D.C. motor $m$ to run at a constant speed. Because in this conventional method the control transistor $T_c$ works as a variable resistor, the loss of the electric power in the control transistor $T_c$ is so large that it is necessary to use an expensive transistor for large electric power as the control transistor $T_c$, and thus the efficiency of the system including the control circuit is inferior.

Whereas according to the present invention even a control transistor for the small electric power can do, whereby the efficiency of the system including the control circuit is improved.

Figure 2:
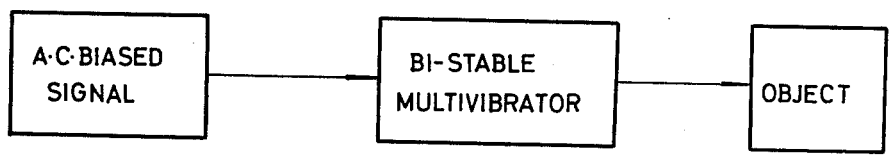
FIG. 2 is a block diagram of the inventive control system.

As shown in FIG. 2, the inventive control system comprises a bi-stable multi-vibrator to control by its out-put an object such as a motor. As the bi-stable multi-vibrator receives an A.C. biased signal, the out-put of the bi-stable multi-vibrator becomes a duty controlled signal. The term "duty control" means a power-consumptionless control or a pulse train control with a switching element.

Figure 3:
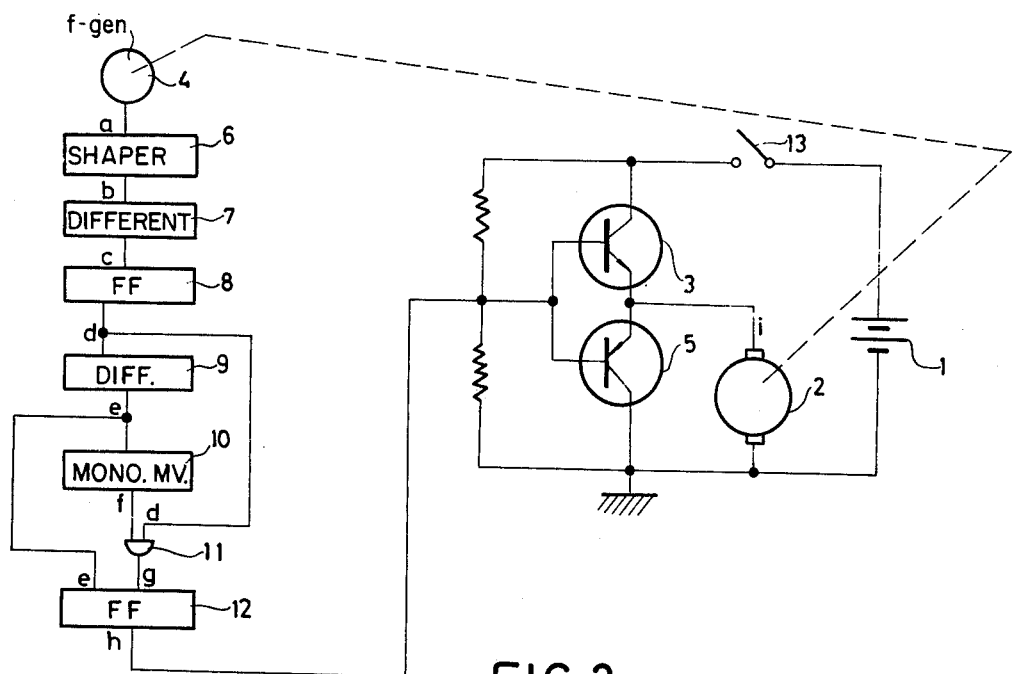
FIG. 3 shows a block circuit diagram of a first embodiment of the present invention.

In FIG. 3, a direct current source 1 energizes a system including a DC motor 2 through an NPN transistor 3 and is also connected to a NPN transistor 5. A frequency generator 4 responds to the rotational speed of the motor 2 and applies its output to a shaper circuit 6 to reshape its waveform. A positive differentiating circuit 7 responds to the shaper 6 and applies its output to a flip-flop circuit 8 which applies its signal to one input of an AND gate 11 as well as a positive differentiating circuit 9, which in turn applies its output to a flip-flop 12 and a monostable multivibrator 10. A switch 13 connects the source to the NPN transistor 3.

Below the operation of the first embodiment in FIG. 3 is explained in detail further referring to FIGS. 4 and 5.

Figure 4:
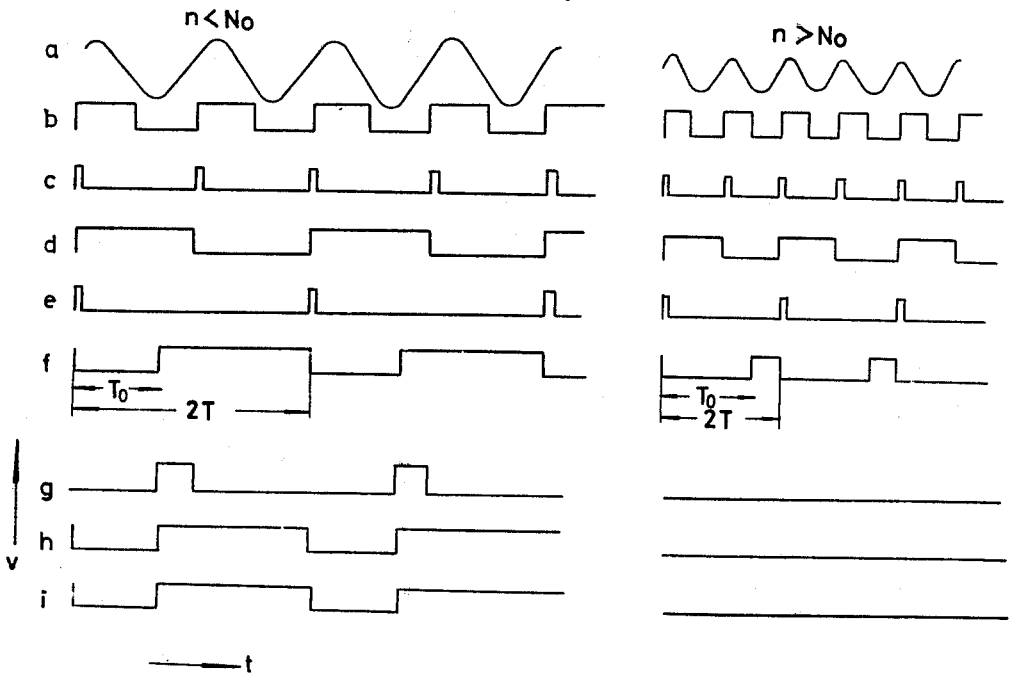
FIG. 4 shows wave forms at each part of the diagram shown in FIG. 3 each in an accelarating state and a deccelarating state, FIGS. 5-A and 5-B show schematic circuit diagrams of the accelarating state and of the deccelarating state in case of the first embodiment shown in FIG. 3.

FIG. 4 shows wave forms at each part in an accelarating state and a deccelarating state.

The wave forms on the left show the case when the speed n is smaller than the normal speed $N_o$, while the wave forms on the right show the case when n is larger than $N_o$. The abscissa shows time while the ordinates show the voltage. In FIG. 4 and FIG. 5 $a$ is the in-put voltage to shaper 6 from frequency generator 4, $b$ is the in-put voltage to differentiator 7 from shaper 6, $c$ is the in-put voltage to flip-flop 8 from differentiator 7, $d$ is the in-put voltage to differentiator 9 and 11 AND gate from 8 flip-flop, $e$ is the in-put voltage to monstable multiviterator 5, 10 and 12 from differentiator 9, $f$ is the in-put voltage to AND gate 11 from monostable multivibrator 10, $g$ is the in-put voltage to 12 flip-flop from 11, $h$ AND gate is the in-put voltage to transistors 3 and 5 from flip-flop 12 and $i$ is the voltage between the terminals of the motor 2.

Because the voltage $i$ between the terminals of the motor 2 is lower than the voltage $h$ at first, when the switch 13 for the electric source 1 is closed, the control transistor 3 is switched on while the deccelarating transistor 5 is switched off, so that the motor 2, being always under the constant voltage $i$ in the accelarated state $(n < N_o)$, is accelarated gradually. Thus, the frequency generator 4 connected with the motor 2 is accelarated, either of the voltage wave form $a$ for $(n < N_o)$ or $a$ for $(n > N_o)$ responsive to the rotation speed is obtained. When this wave signal is reformed by the shaper circuit, either $b$ for $(n < N_o)$ or $b$ for $(n > N_o)$ is obtained. This is converted into the signal $c$ for $(n < N_o)$ or the signal $c$ for $(n > N_o)$ by the positive differentiating circuit 7, and further into $d$ by the first flip-flop circuit 8, which signal $d$ is converted into either $e$ for $(n < N_o)$ or $e$ for $(n > N_o)$ by the positive differentiating circuit 9. When the signal $e$ for $(n < N_o)$ or the signal $e$ for $(n < N_o)$ is given to the mono-stable multi-vibrator 10 whose time constant is a certain determined value, the switch-off signal $f$ for $(n < N_o)$ or the switch-off signal $f$ for $(n > N_o)$ whose pulse time interval $T_o$ is independent if the rotation speed is obtained. When the signal $f$ and the signal $d$ are given to the AND-circuit 11, the out-put $g$ for $(n > N_o)$ is always zero while the out-put $g$ for $(n < N_o)$ is a pulsive voltage whose time interval is substantially given by $(N_0 - n/n)T_o = 2T$ whereby further the time interval $T_o$ when the pulse stands up is constant for each cycle.

When the re-set signal $e$ and the out-put $g$ of the AND-circuit are applied to the second flip-flop circuit 12, the out-put signal $h$ for $(n < N_o)$ of the circuit 12 gives the switch-on pulses $h$ substantially between $T_o$ and $2T$. This signal $h$ is given to the base of the control transistor 3 is such a manner that the timing for supplying the motor 2 with electricity from the electric source is controlled. In other words, the timing for supplying the motor 2 with electricity being $(2T - T_o)$ for $2T$, the duty is given substantially by $(1 - n/2N_o)$, so that the accelaration is increased in case $n$ is small and falls down to zero discontinuously from ½ in case $n$ becomes equal to $N_o$ in such a manner that the constant speed can be obtained with high precision, and the starting characteristics is very excellent. $h$ for $(n > N_o)$ is obtained when the re-set signal $e$ and the out-put of the AND-circuit are given to the second flip-flop circuit 12, whereby $h$ for $(n > N_o)$ is always zero.

Figure 5:
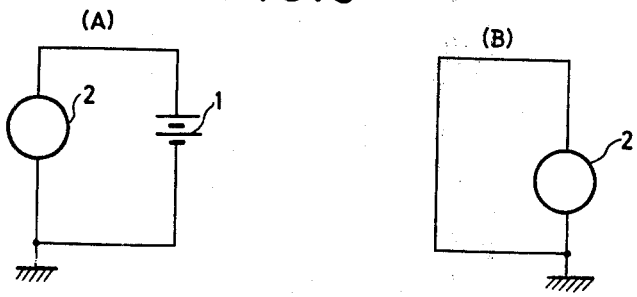

Now the operation of the control transistor 5 is explained further in reference to FIG. 5. When in the accelarated state $(n < N_o)$ the duty of the control transistor 3 being given by $(1 - n/2N_o)$, while the transistor 3 is switched on, the transistor 5 is switched off as shown in FIG. 5-A. While the transistor 3 is switched off even in case that n is smaller than $N_o$, the deccelarating effect takes place due to the couter electromotive force induced by the self-rotation due to the inertia of the motor 2 itself as shown in FIG. 5-B. In case that $n$ is larger than $N_o$, it goes without saying that the deccelarating effect always takes place as shown in FIG. 5-B.

Figure 6:
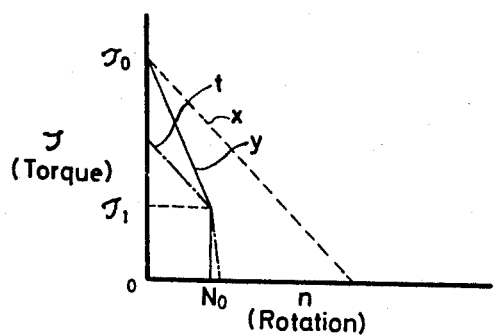

FIGS. 6 and 7 show characteristics to explain the operation of the first embodiment of the present invention.

The characteristics of the torque to the rotation speed in FIG. 6 is briefly explained. In the drawings, the characteristics of the motor 2 only is given by the dotted line $x$, while the characteristics of the inventive system is given by the line $y$. With the conventional control system, the characteristics becomes as shown in the dotted line $z$. As compared with the conventional control system, the characteristics for starting and speed constancy is improved, and the power loss is decreased, thus improving the efficiency of the system.

The characteristics of the torque to the electric current in FIG. 7 is briefly explained. The dotted line $x'$ shows the characteristics of the motor itself and the dotted line $z'$ shows the characteristics obtained by the conventional control system, while the line $Y$ shows the characteristics of the torque to the electric current by the control system according to the present invention. According to the present invention a large torque can be obtained with a small electric current and the efficiency is improved in comparison with the conventional system and the rotation speed is stabilized when the torque $\tau$ is $\tau_1$ as shown in FIG. 6.

FIGS. 8 and 9 are block circuit diagram of the driving system according to the present invention.

FIG. 8 shows the block circuit diagram of the drive control system, in case an A.C. electric source is used as electric source, an A.C. motor instead of the D.C. motor.

The difference from FIG. 3 lies in the fact that the time constant of the mono-stable multi-vibrator 10 is made variable, and an A.C. electric source and an A.C. motor 2 are used. 3 and 5 are both NPN transistors, 14 is a variable element to vary the time constant of the mono-stable multi-vibrator, 15 is a transformer, and 16 and 17 are both full wave rectifiers.

Because the embodiment in FIG. 8 is equipped with the variable element to vary the time constant, a stepwise multi-speed regulation or a stepless speed regulation can be realized whereby the driving speed is stabilized with high precision, and according to the arrangement as shown in the drawing the drive control of the A.C. motor 2 becomes possible with the A.C. electric source 1. It goes without saying that the control system can be altered into the drive control of a D.C. motor with an A.C. electric source.

By composing the detecting means for detecting the rotation speed photoelectrically, mechanically or electromagnetically or by providing the equipment with some switch-over means for speed change, the control circuit which is made as I.C. as a unit according to the present invention can be made adaptable to various embodiments, whereby it is possible that the control circuit made as I.C. could be built either in the rotor or in the stator of the motor.

FIG. 9 shows the main parts of the embodiment of the system according to the present invention in which instead of the mono-stable multi-vibrator a counter 10 consisting of a bistable multi-vibrator and so forth is used. In the drawing i is a standard reference frequency generator like a crystal oscillator, whereby it is also possible to make the standard frequency as an out-put of the generator variable, inserting a frequency converter in it. ii, iii and iv are all flip-flop circuits, to each of which the out-put e of the positive differentiating circuit 9 is given as re-set signal, while the out-put of i is given to ii, the out-put of ii to iii, and the out-put of iii to iv. i, ii, iii and iv which are connected as above compose the above-mentioned counter 10.

From the embodiments in FIGS. 8 and 9 similar operations in the explanation for FIGS. 3 and 4 and a similar characteristics and efficiency in the explanation for FIGS. 6 and 7 are expected, so that a detailed explanation of them is omitted.

Further it can also be thought out to compose the motor to be controlled as a pulse motor in such a manner that the pulse motor is driven and controlled at a certain determined time interval, by stabilizing the time interval of the drive cycle.

Figure 10:
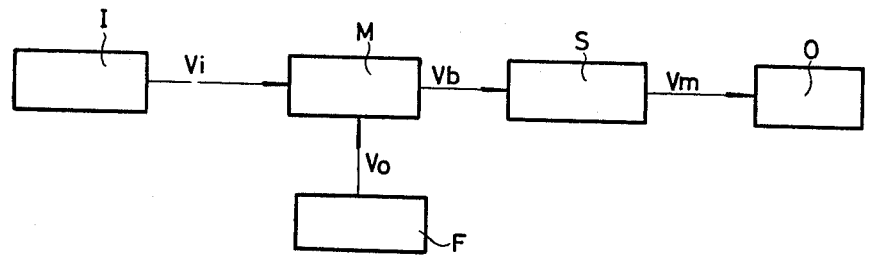
FIG. 10 shows a block diagram of a second embodiment of the control system according to the present invention.
Figure 11:
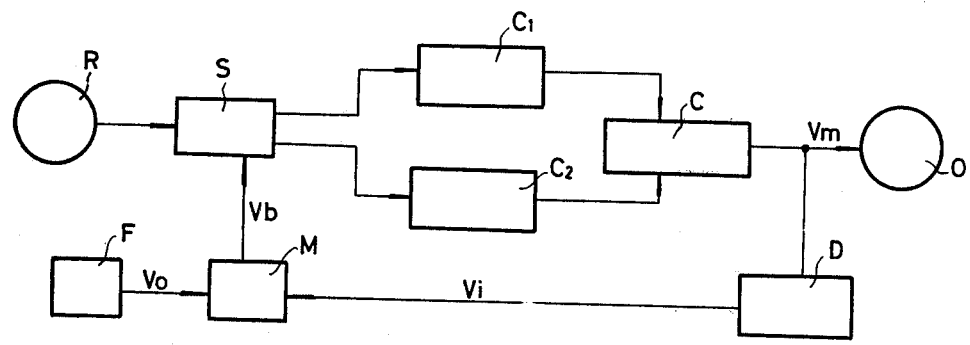
FIG. 11 shows a block diagram of a third embodiment which is an automatic control system according to the present invention.

The 2nd and 3rd embodiments of the present invention shown in FIGS. 10 and 11 respectively refers to an improvement of the control system and is characterized in that the control system is constructed in such a manner that the object to be controlled is connected with the out-put circuit of a Schmitt-circuit and an in-put signal mixed with an alternating signal is given to the in-put circuit of the Schmitt-circuit.

FIG. 10 shows a block diagram to explain the second embodiment. In the drawing I is a source of in-put signal, M is a mixer, F is an alternating source, S is a Schmitt-circuit and O is an object to be controlled.

FIG. 11 shows the third embodiment of the present invention. In FIG. 11, R is a reference commander, S is a comparator presenting a Schmitt-circuit, $C_1$ and $C_2$ respectively are a controlling part, C is a controllor, O is a controlled quantity, D is a detecting part, F is an oscillator and M is a mixing part.

FIG. 11 shows a circuit of the second embodiment of the present invention, wherein F is an oscillator, 24, 25 and 29 are respectively a transistor, 21, 22, 23, 23' and 26 respectively a resistor, 2 is a motor and 1 is an electric source.

Below the third embodiment is explained in details referring to FIG. 11. Because the transistors 24 and 25 compose a Schmitt-circuit, when the electric potential of the base of 24 becomes higher than a certain determined electric potential $v^+$ the transistor 24 is switched on, the transistor 25 is switched off and the transistor 29 is also switched off in such a manner that the out-put $v_m$ becomes a certain determined electric potential O. When on the other hand the electric potential of the base of 24 becomes lower than a certain determined electric potential $v^-$, the transistor 24 is switched off, 25 is switched on and 29 is also switched on in such a manner that the output $v_m$ becomes a certain determined electric potential $E_0$.

Suppose that a signal $v_b = v_i + v_0 \sin t$ which is the mixture of an in-put signal $v_1$ and an alternating signal of amplitude $v_O$ and of a frequency is given to the base of the transistor 24. Hereby represents an angular frequency of the alternating current signal while the period $T_p$ is a reciprocal thereof.

The time $T_1 = 1/\omega \sin^{-1}(v^+ + v_i/v_o)$ when $v_b$ becomes large and the transistor 25 is switched on is obtained from the equation:

$$v_b = v_i + v_o \sin\omega\, T_1 = v^+$$

Further, the time $T_2 = 1/\omega \sin^{-1} v^- - v_i/v_o$ when $v_b$ becomes small and the transistor 25 is switched off, is also obtained from the equation:

$$v_b = v_i + v_o \sin\omega\, T_2 = v^-$$

Figure 13:
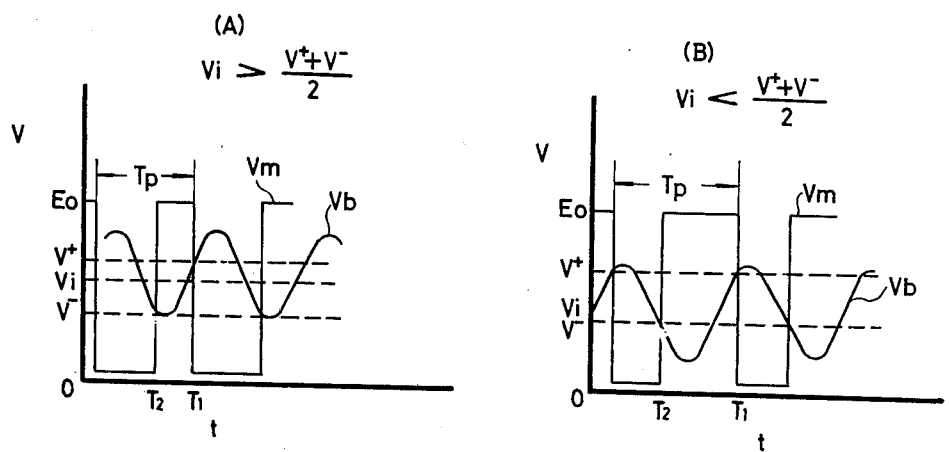
FIGS. 13 and 14 show respectively a graph to explain the operation of the circuit in FIG. 12.

Thus, $v_m$ changes from $E_o$ to O abruptly at $T_1$ and from 0 to $E_o$ also abruptly at $T_2$, representing a square wave form as shown in FIGS. 13-A or 13-B, so that the effective value $v_{me}$ of $v_m$ is given by the following equation:

$$v_{me} = E_o \frac{T_1 - T_2}{T_p} = E_o \omega \left\{ \frac{1}{\omega} \sin^{-1}\left(\frac{v^+ - v_i}{v_o}\right) - \frac{1}{\omega} \sin^{-1}\left(\frac{v^- - v_i}{v_o}\right) \right\}$$

Figure 12:
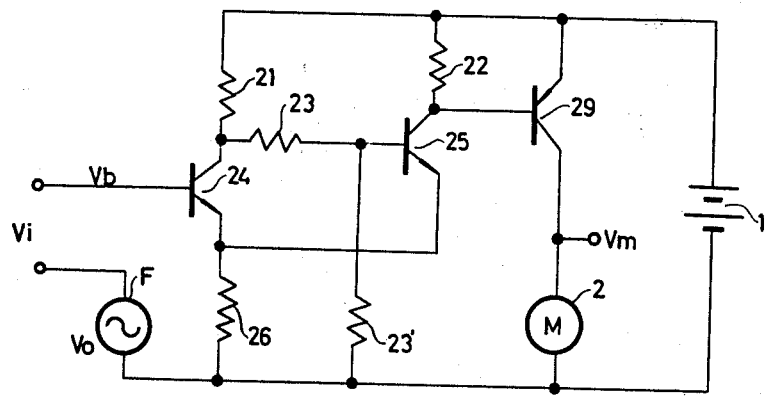
FIG. 12 shows a circuit diagram of a circuit of the second embodiment according to the present invention.

Respectively in FIGS. 13-A and 13-B, the time $t$ is shown in abscissa and $v$ is shown in ordinate, and the electric potential $v_b$, as an A.C. biased in-put, of the transistor 24 of FIG. 12 and the terminal electric potential $v_m$ of the motor 2 as well as $v^+$, $v^-$ and $v_o$ are shown. FIG. 13-A shows the case when $v_i$ is larger than $v^+$ plus $v^-$ devided by two ($v_i > v^+ + v^-/2$) while FIG. 13-B shows the case when $v_i$ is smaller than $v^+$ plus $v^-$ devided by two ($v_i < v^+ + v^-/2$).

Figure 14:
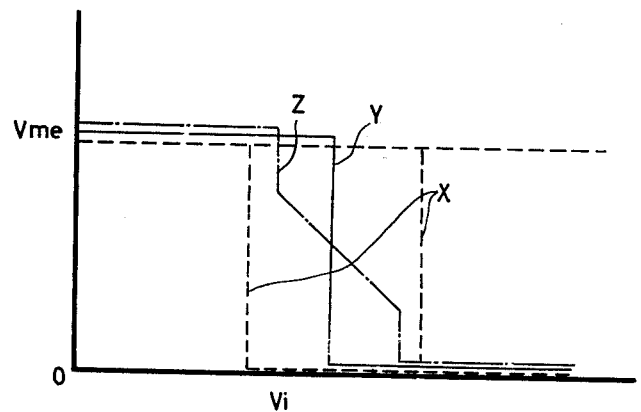

In FIG. 14 $v_i$ is shown in abscissa and $v_{me}$ is shown in ordinate. The dotted line x shows the case when $v_0$ is smaller than $v^+$ minus $v^-$ devided by two ($v_o < v^+ - v^-/2$), namely the alternating current component is small, the solid line y shows the case when $v_o$ is equal to $v^+$ minus $v^-$ devided by two ($v_o = v^+ - v^-/2$), and the dotted line z shows the case when $v_o$ is larger than $v^+$ minus $v^-$ devided by two ($v_o > v^+ - v^-/2$), namely the alternating current component is large. When the alternating component is small a hysterisis characteristics as shown by $x$ is noticed, while when $v_0$ is equal to $v^+$ minus $v^-$ devided by two ($v_o = v^+ - v^-/2$), the hysterisis characteristics can not be noticed as shown by $y$. When the alternating component is large, namely $v_o$ is larger than $v^+$ minus $v^-$ devided by two ($v_0 > v^+ - v^-/2$), the characteristics becomes as shown by $z$. Thereby it is possible to obtain various other characteristics by changing the wave form of the out-put of the oscillator.

Figure 15:
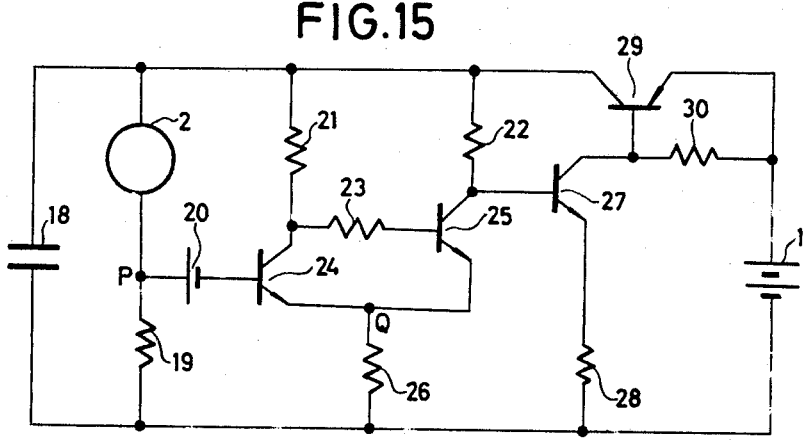
FIG. 15 shows a circuit of the third embodiment.

Below the embodiment in FIG. 15 is explained in detail. In FIG. 15, 18 is a condensor, 2 is a D.C. motor, 19, 21, 22, 23, 26, 28 and 30 are resistors, 20 is a reference electric source 24 and 25 are transistors composing a Schmitt-circuit, 27 is a control transistor for an amplifying transistor 29, and 1 is an electric source.

Assumming that the equivalent value of internal resistance of the D.C motor 2 is $R_a$, the value of resistors 19, 21, 22 and 26 are $R_{19}$, $R_{21}$, $R_{22}$ and $R_{26}$, the values of 19, 21, 22 and 26 are chosen in such a manner that $R_{21}$ is equal to $R_{22}$ and $R_a$ devided by $R_{19}$ is equal to $R_{21}$ devided by $R_{26}$, namely $$R_{21} = R_{22}$$

$$R_a/R_{19} = R_{21}/R_{26}$$

One of the transistors 24 and 25 forming a Schmitt-circuit is switched off when the other is switched on.

When the base current of the transistors 24, 25 and 27 are negligible and the voltage between the collector and the emitter of the transistors 24 and 25 are also negligible, the D.C. motor 2, the resistor 19, 21 (or 22) and 26 composes a bridge circuit, so that between the terminals P and Q in FIG. 15 a voltage depending exclusively upon the rotation speed n of the D.C. motor is generated, but having nothing to do with the D.C. motor and the electric source. According to the sign of the difference between the above-mentioned generated voltage and that of the reference electric source, the Schmitt-circuit is acted, and by its out-put the control transistor 29 is duty controlled in such a manner that the electric power is supplied to the D.C. motor and the Schmitt-circuit controls the D.C. motor 2 to run at a constant speed. The condensor 18 is for smoothing the electric power supplied to the D.C. motor 2 and the Schmitt-circuit.

In the embodiment shown in FIGS. 16, 17, 18 and 19, 4 is a Tacho-generator, 31 is a variable resistor or a potentio-meter, 32 is a diode such as a zener diode, S is a Schmitt-circuit, 33 is a semi-conductive control element, 2 is a motor and 1 is an electric source.

Figure 16:
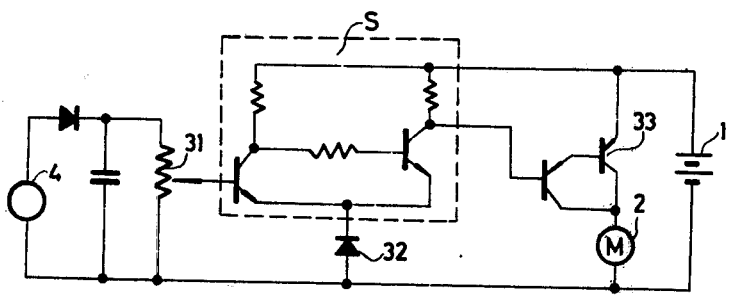
FIGS. 16, 17 and 18 show respectively another circuit of the third embodiment.

Below the operation of the embodiment shown in FIG. 16 is explained. When the rotation speed of the motor 2 is low the out-put of the Tacho-generator is also low. This out-put is compared with the terminal voltage of the diode 32 by the Schmitt-circuit S, so that the out-put of S becomes small, the control circuit 5 of the transistors of Darlington connection is switched on and a large voltage is applied to the motor 2 in such a manner that the motor 2 is accelerated.

When on the other hand the rotation speed of the motor 2 is large, the out-put of the Tacho-generator 4 is large, while the voltage across the diode 32 is constant so that the out-put of the Schmitt-circuit S becomes large and the control circuit 5 is switched off in such a manner that the motor 2 is deccelerated.

The motor 2 is so controlled as to run always at a constant speed due to the action of the above-mentioned control circuit.

Figure 17:
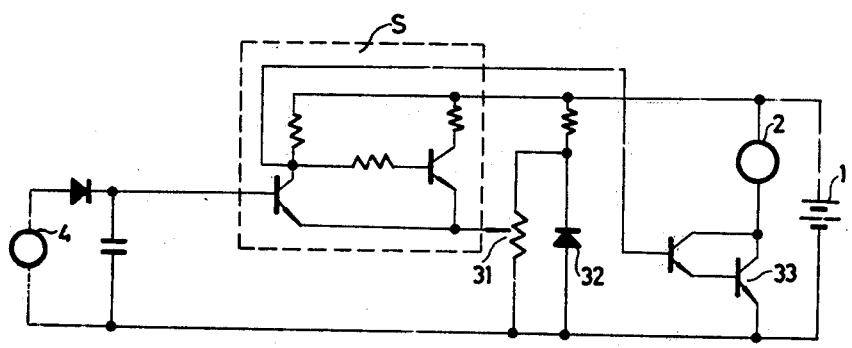

FIG. 17, the out-put of the Schmitt-circuit S is taken out in a different way from the case of FIG. 16, and the connections of 2, 32 and 33 are changed with a slight modification.

Figure 18:
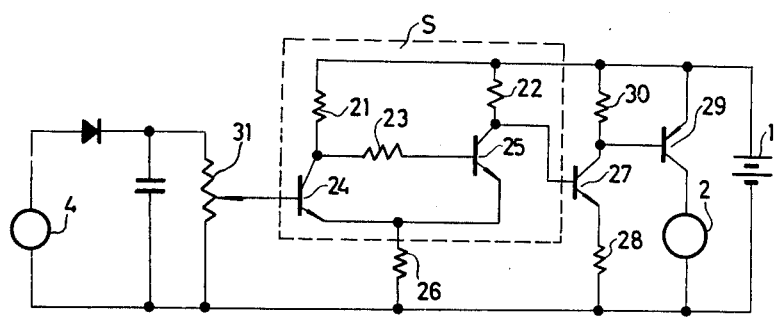

In FIG. 18, the connections at 32 and 33 are made in a different way from the cases of FIGS. 15 and 16. When the voltage of the source 1 is constant, the electric current which runs through the emitter resistor 26 always becomes nearly constant, by choosing the collector resistors 21 and 22 of the Schmitt-circuit S equal to each other. In consequence, the motor control with high precision is realized without using diodes such as a zener diode. Because further the control transistor is duty controlled, only a small electric power suffices, so that it becomes possible to offer an inexpensive and precise control circuit together with the elimination of diodes such as a zener diode.

Figure 19:
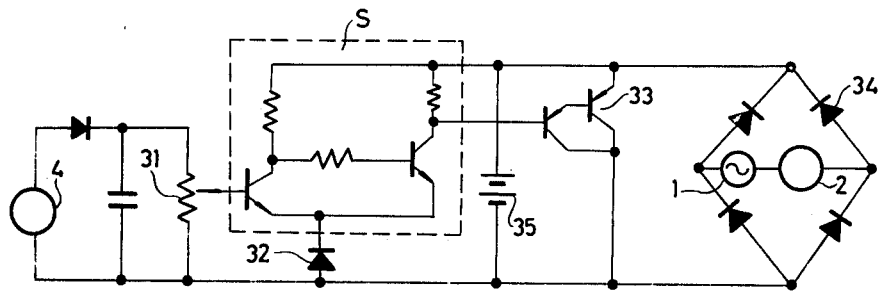
FIG. 19 shows a circuit of the third embodiment with an A.C. supply.

In FIG. 19, an A.C. motor with A.C. supply is controlled in a similar way, and 34 is a diode for rectification.

As mentioned above the present invention refers to a system which can consist of the detecting and control circuits with merely a small electric power, capable of being constructed with only a few elements, so that it is possible to standardize it as well as construct it in an integral circuit with sufficient consideration of the thermal compensation. Further it is possible to build the control circuit not only in the stator side but also in the rotor side of the motor as well as to build the control circuit not only in the stator side but also in the rotor side of the Tacho-generator. Further many other various constructions can be realized in order to improve the efficiency of the speed control and of driving acceralating characteristics, control characteristics, starting characteristics and so on.

Figure 20:
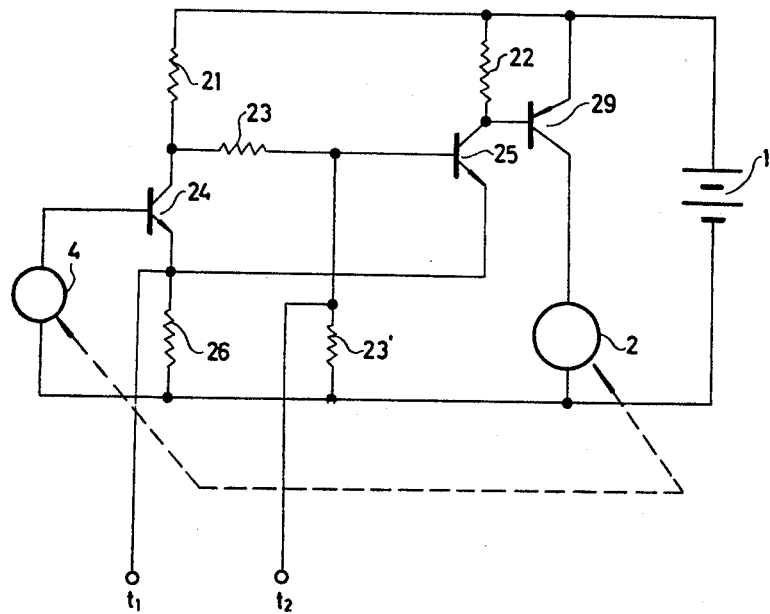
FIGS. 20 and 21 show respectively a circuit of the third embodiment shown in FIG. 11.

In an automatic control circuit shown in FIG. 20 the out-put $v_b$ of a Tacho-generator is the mixture of a D.C. voltage $v_g$ being proportional to the rotation speed of a motor 2 and the A.C. voltage $v_{go}$ as the motor is functionally connected with the Tacho-generator. Likely as explained for FIG. 12 the relation between the D.C. voltage $v_g$ and the effective value $v_{me}$ of the terminal voltage of the motor gives a characteristics similar to that of FIG. 14. As is clear from the FIG. 14 the rotation speed of the motor becomes small and $v_{me}$ becomes large in such a manner that the motor is accelerated. When the rotation speed of the motor is large, $v_g$ becomes large and $v_{me}$ becomes small in such a manner that the motor is deccelarated.

In consequence the motor 2 is controlled to run at a certain determined speed independent of its load. It is possible to change the set speed by changing the electric potentials at the terminals $t_1$ and $t_2$, so that it is possible to drive the motor 2 by remote control as well as to carry out so called stepwise speed regulation and stepless speed regulation effectively.

Figure 21:
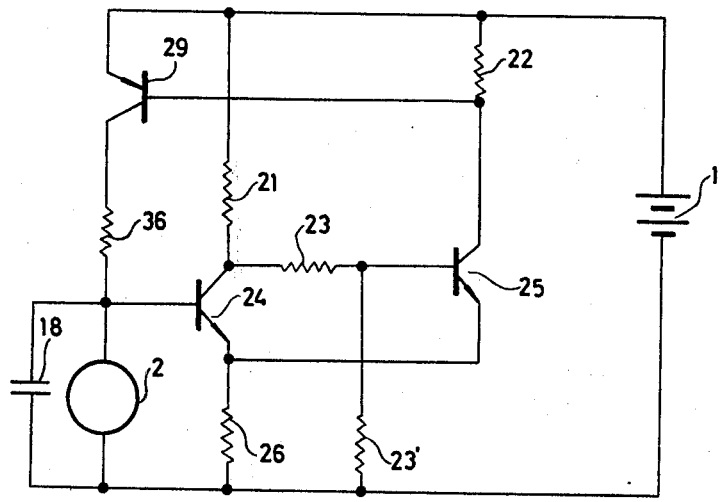

In FIG. 21, 36 is a resistor, 18 is a condensor. When the rotation speed of the motor 2 is small, the transistor 24 is switched off, the transistor 25 is switched on and the transistor 29 is also switched on in such a manner that the effective value of the terminal voltage becomes large and the motor 2 is accelarated. When on the other hand the rotation speed of the motor 2 becomes large, the transistor 24 is switched on, the transistor 25 is switched off and the transistor 29 is also switched off in such a manner that the effective value of the terminal voltage of the motor 2 becomes small and the motor 2 is deccelarated. The control transistor 29 in this circuit repeats the switching on and off, acting at the same time as an oscillator, so that it is not necessary to install another independent oscillator. The condenser 18 is not always necessary, but serves to promote the oscillation. The in-put signal mixed with a signal presenting a higher frequency than that of the above-mentioned in-put signal is given, so that as compared with the conventional system of this kind not only it operation characteristics is superior but also its construction is simplified.

The circuits shown in FIGS. 22 to 29 refer to a motor drive control system to control a direct current motor to run at a constant speed independent of variation in the load, supplied voltage of the source and ambient temperature. The variation in temperature is compensated by inserting a thermistor in the Schmitt-circuit.

Figure 22:
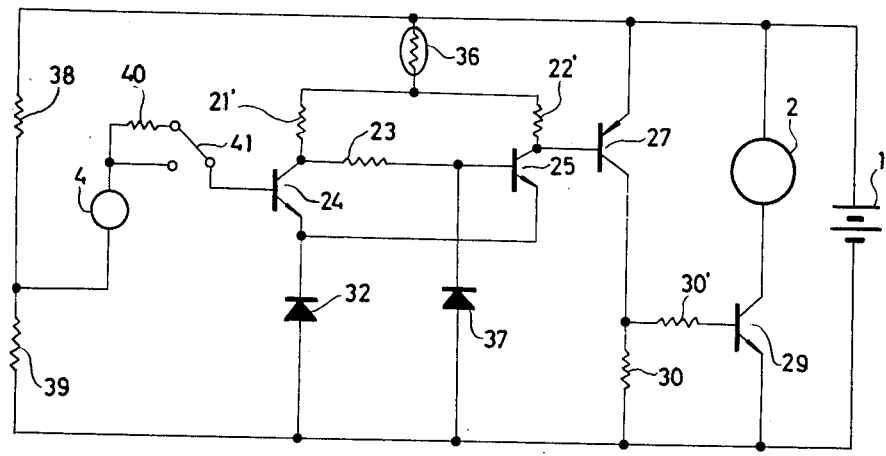
FIG. 22 shows a circuit with a thermister of the third embodiment according to the present invention.
Figure 32:
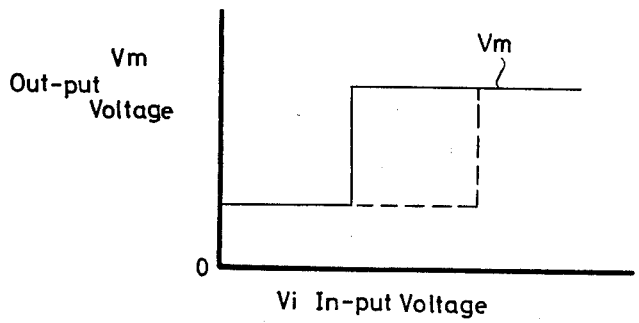
FIG. 32 is a graph showing the relation between the in-put and the out-put of the circuit shown in FIG. 30.

In FIG. 22, 32 and 37 are elements like zener diodes to keep the electric potentials of the emitters of the transistors 24 and 25 and the electric potential of the base of the transistors 25, 27 is a PNP transistor for switching, 29 is an NPN transistor for control, 2 is a direct current motor and 1 is an electric cource. 30' is a base resistor of the transistor 29, 21' and 22' are collector resistors of the transistors 24 and 25 respectively and 36 is a thermistor. A resistor 40 is provided for the slow-down of a regulated speed, 41 is a switch for changing the regulated speed, 38 and 39 are resistors as a bleeder circuit.

Figure 23:
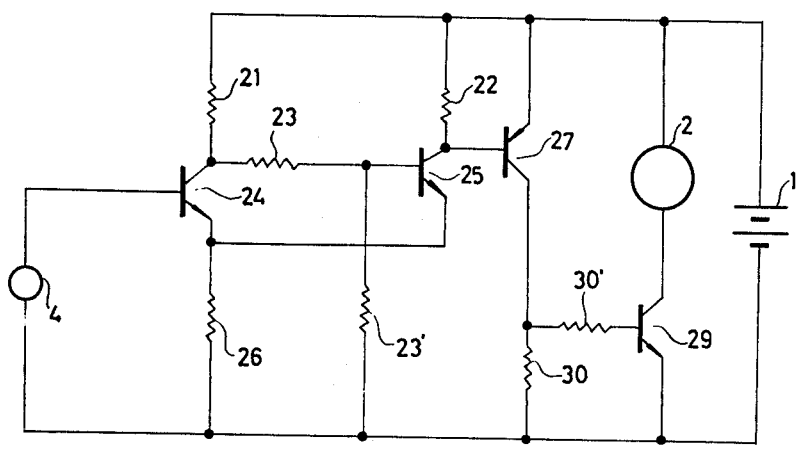
FIGS. 23 to 29 respectively show another circuit with a thermister of the third embodiment of the system according to the present invention.
Figure 24:
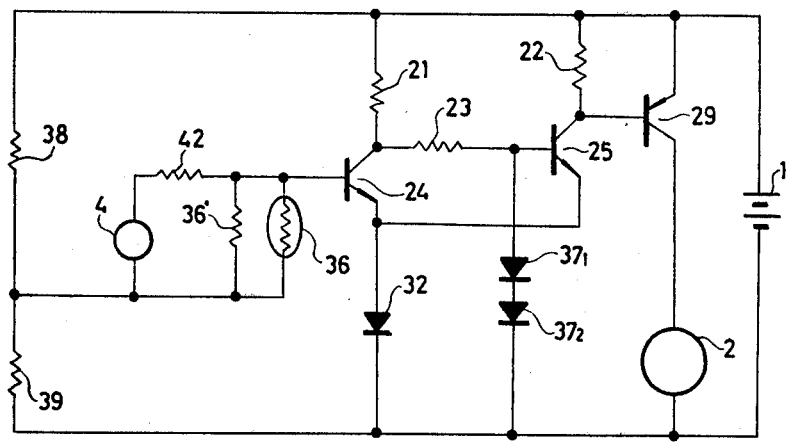
Figure 25:
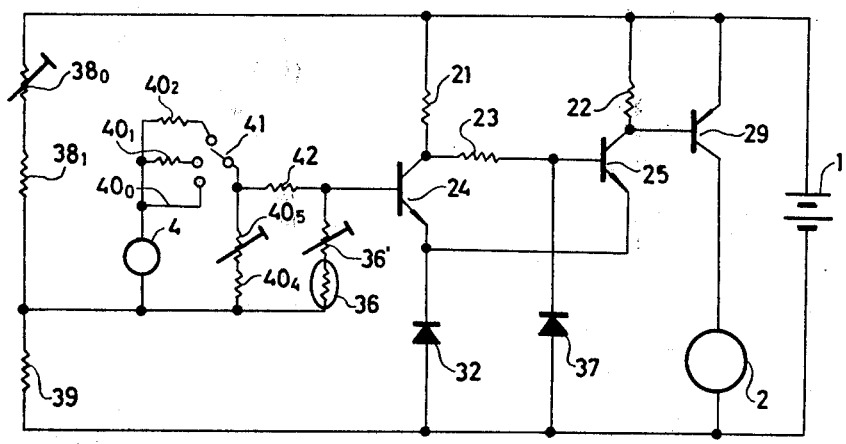

In FIGS. 23, 24 and 25 composes a Schmitt-circuit, so that when the base potential $v_b$ of 24 becomes larger than the electric potential $v+$ decided by the base emitter voltage of the transistor 24 and the resistive element 26, the transistor 24 is switched on and the transistor 25 is switched off. In consequence the transistors 27 and 29 are switched off. On the contrary when the potential $v_b$ of the base of the transistor 24 becomes smaller than the electric potential $v-$ decided by the voltage of the resistive element 23' and the base-emitter voltage of the transistor 25, the transistor 24 is switched off while the transistor 25 is switched on, so that the transistor 27 and 29 are switched on.

When the rotational speed n of the motor 2 is small, the out-put of the Tacho-generator 4 becomes small, the base potential $v_b$ becomes small in comparison with the potential $v-$, the transistor 29 becomes normally switched on from the above-mentioned reason and the motor 2 is accelerated. With the increase of the rotation speed n of the motor 2, the out-put of the Tacho-generator 4 increases so that when the base potential $v_b$ of the transistor 24 passes through the potential $v+$ at $T_{1'}$, the motor 2 is deccelarated until the base potential $v_b$ becomes lower than $v-$ at $T_{2'}$. Hereby the time interval ($T_{1'} - T_{2'}$) from the time point when $v_b$ becomes higher than $v+$ till the time point when $v_b$ becomes lower than $v-$ is long, when n is large. Because the out-put of 4 contains an alternating component, with the increase of the rotation speed of the motor 2, the deccelarating time interval also increases. In short the duty of the terminal voltage of the motor changes. This change of the duty makes and breaks the drive of the motor in such a manner that the motor 2 is controlled to run at a constant speed.

The thermistor 36 serves to keep the motor 2 running at a constant speed, while compensating the variation in the working point of the circuit arising from the change of the base-emitter voltage of the transistors 24 and 25 and variation in the constants of the resistive elements 26 and 23' due to the temperature variation. However, when there is no temperature variation, the thermistor 36 is not necessary. The resistors 38 and 39 serve to keep the motor running at a constant speed, compensating the variation in the potentials $v+$ and $v-$ due to the variation in the voltage of the source arising from the change of the terminal voltage of the resistor 39 by an amount corresponding to the variations in the potentials $v+$ and $v-$. However, when there is no variation in the voltage of the source, the resistors 38 and 39 are not necessary. The resistor 40 and the switch 41 serve to make the speed to be controlled multiple. When there is not need for the multiple speed control, 40 and 41 are not necessary.

FIG. 23 shows the control circuit of the motor, however, without change-over of a regulated speed, thermal compensation and a supplied voltage compensation for the electric source. When the voltage of the source is constant, the resistive elements 26 and 23' in FIG. 23 may be economically substituted by resistors. Further it is possible to control the speed by making the voltage of the source variable.

Figure 36:
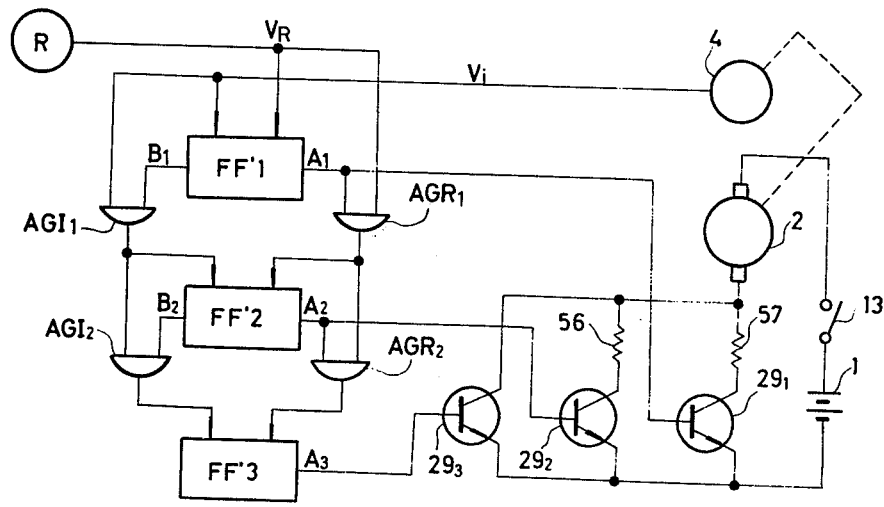
FIG. 36 shows a circuit diagram of a fifth embodiment according to the present invention.

In FIG. 24, 42 and 36' are resistors, 36 is a thermistor, and 32, $37_1$ and $37_2$ are diodes. This circuit is characterized in that cheep diodes are used instead of expensive zener diodes.

In FIG. 25, $38_1$, $40_0$, $40_1$, $40_2$, $40_3$ and $42_1$ are resistors, $38_0$, $40_5$ and 36' are trimmer resistors, and 36 is a thermistor. This circuit is characterized in that when this circuit is manufactured in a factory, the compensation of the voltage of the source can easily be carried out with the trimmer resistor $38_0$, the compensation of the rotation speed at a standard speed with the trimmer resistor $40_5$ and the thermal compensation with the trimmer resistor 36'.

Figure 26:
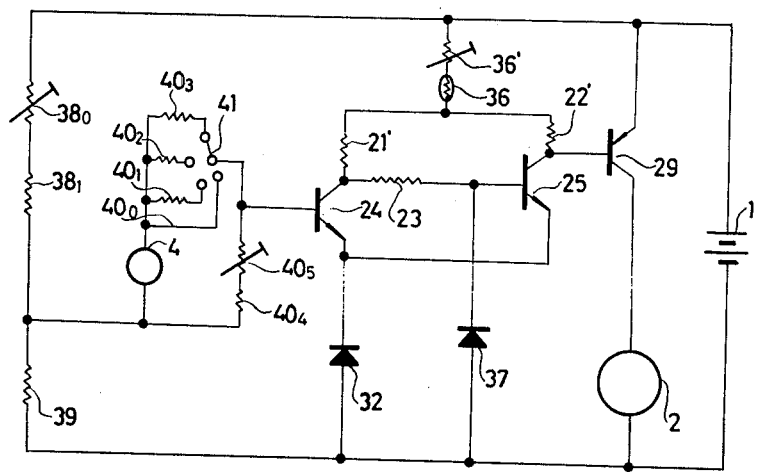

In FIG. 26, $38_1$, $40_0$, $40_1$, $40_2$, $40_3$ and $40_4$ are resistors, $38_0$, $40_5$ and 36' are half-fixed trimmer resistors and 36 is a thermistor.

Figure 27:
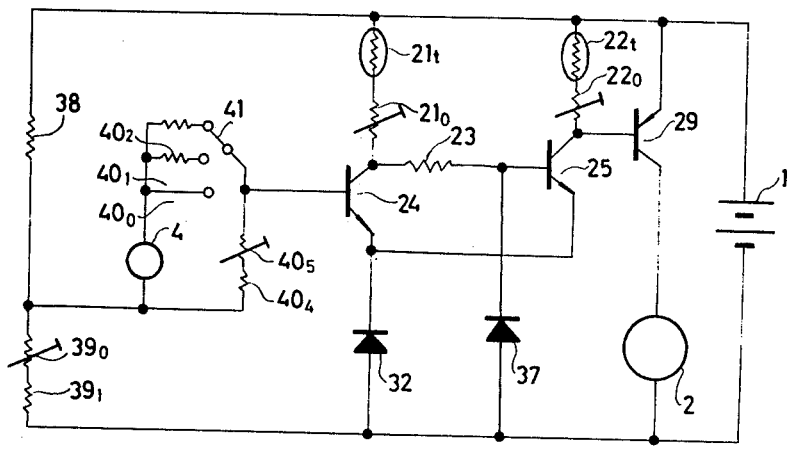

In FIG. 27, $39_1$, $40_0$, $40_1$, $40_2$ and $40_4$ are resistors, $39_0$, $40_5$, $26_0$ and $22_0$ are half-fixed resistors and $21_t$ and $22_t$ are thermistors.

Figure 28:
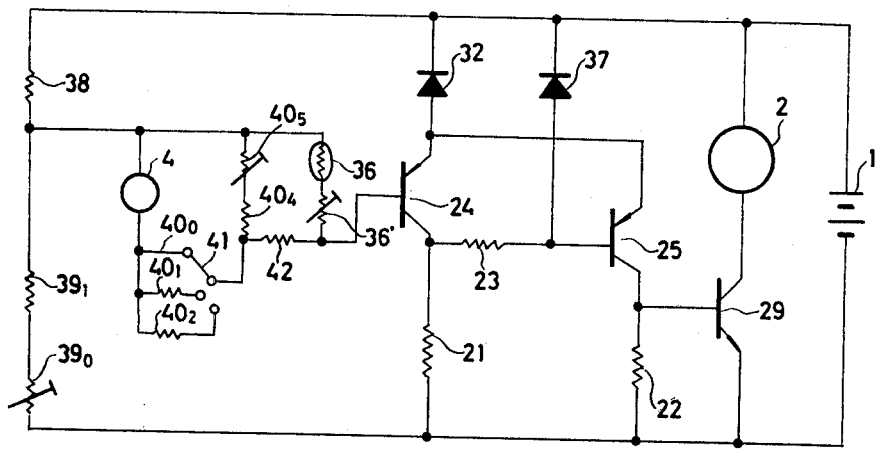

In FIG. 28, $39_1$, $40_0$, $40_1$, $40_2$, $40_4$ and 42 are resistors, $39_0$, $40_5$ and 36' are half-fixed resistors and 36 is a thermistor.

Figure 29:
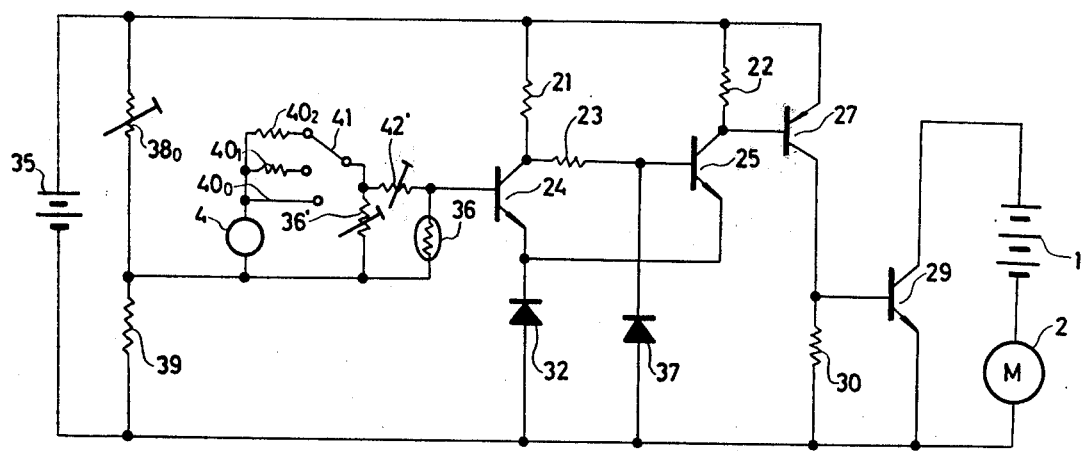

In FIG. 29, $38_0$, 36' and 42' are half-fixed resistors, 36 is a thermistor and 1 is an electric source. The circuit is characterized in that the motor has its own electric source 1, while a separate electric source 35 is provided for the control.

The in-put to out-put characteristics of a Schmitt-circuit presents a hysterisis characteristics and therefore the in-put voltage $v-$ from switching-on to switching-off is different from the in-put voltage $v+$ from switching-off to switching-on as shown before by dotted line in FIG. 5.

Figure 30:
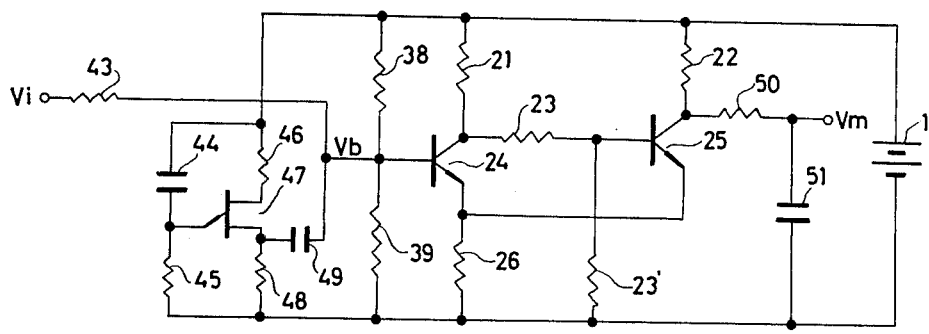
FIG. 30 shows a circuit of the second embodiment according to the present invention.

According to the second embodiment particularly shown in FIG. 30, the hysteresis characteristics of the out-put of the Schmitt-circuit is eliminated by a pulse biased signal $v_b$ through mixing of an in-put signal $v_i$ of the Schmitt-circuit with a pulse train.

Further the pulse train mixed in the in-put signal $v_b$ of the Schmitt-circuit is eliminated by using an integrating circuit in the out-put circuit of the Schmitt-circuit.

In FIG. 30, 44, 49 and 51 are respectively a condensor, 43, 45, 46, 48, 38, 39, 21, 22, 23, 23', 26 and 50 are respectively a resistor, 47 is a double-base diode, 24 and 25 are respectively an NPN transistor and 1 is a direct current source. Hereby the circuit consisting of 44, 45, 46, 47 and 48 makes an oscillation and gives a pulsive wave form. 21, 22, 23, 23', 24 and 25 compose a Schmitt-circuit. 50 and 51 make an integrating circuit. The base voltage of the transistor 24 is mixed with pulse train, so that the transistor 24 is brought into a conductive state when the pulse train is given. Thus the hysterisis characteristics is eliminated and further the pulsive component due to the pulse biased in-put signal is also eliminated by means of the integrating circuit connected at the out-put of the Schmitt-circuit, whereby the in-put to out-put characteristics of the circuit shown in FIG. 30 becomes as shown by a solid line of FIG. 32.

The present circuit is characterized in that the hysterisis characteristics of the Schmitt-circuit is eliminated by using the high speed switching characteristics of the Schmitt-circuit. A astable multi-vibrator or other oscillators which give pulsive wave forms can be used as the oscillator which furnishes the pulse train.

In FIG. 30, $v_i$ is the in-put voltage, $v_b$ is the pulse biased in-put voltage which is the mixture of the in-put voltage $v_i$ and the out-put pulse train of the oscillator, to the Schmitt-circuit, and $v_m$ is the out-put voltage to be mentioned later.

Figure 31:
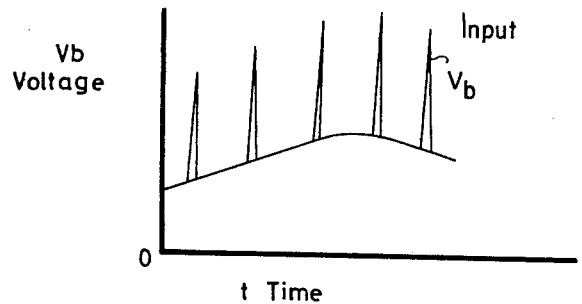
FIG. 31 shows wave forms of the in-put of the Schmitt-circuit of FIG. 30.

FIG. 31 shows the wave form of the voltage $v_b$ to the Schmitt-circuit, whereby the time is shown in abscissa while the in-put voltage $v_b$ is shown in ordinate.

FIG. 32 shows the in-put to out-put characteristics of the switching circuit according to the circuit shown in FIG. 30, whereby the out-put voltage $v_m$ of the integrating circuit connected with the out-put circuit of the Schmitt-circuit is shown in abscissa, while the control in-put voltage $v_i$ (not mixed) to the Schmitt-circuit is shown in ordinate. Hereby it is shown that this switching circuit presents an exellent characteristics as a high speed switching circuit, the hysterisis characteristics being reduced, while the conventional Schmitt-circuit presents strong residual hysterisis characteristics as shown by the dotted line.

Further it goes without saying that the switching characteristics is much improved by inserting a PNP transistor of inversed polarity for inverse amplification between the Schmitt-circuit and the integrating circuit.

In the fourth embodiment of a D.C. synchronous motor shown in FIG. 33, R is a reference oscillator, $R_c$ is a ring counter, $FF_1$, $FF_2$ and $FF_3$ respectively a flip-flop circuit, 55 is a rotor of permanent magnet, $L_1$, $L_2$ and $L_3$ respectively a driving coil wound on the stator, $H_1$, $H_2$ and $H_3$ respectively a detecting equipment for detecting of the rotation position of the rotor 55, $AG_1$ and $AG_2$ and $AG_3$ respectively an AND-gate for the operation of the out-put of the flip-flop circuit $FF_1$, $FF_2$ and $FF_3$ respectively and the out-put of the detecting circuits of the position of rotation with a detecting means, $H_1$, $H_2$ and $H_3$, respectively, $53_1$, $53_2$ and $53_3$ respectively a condensor, $52_1$, $52_2$ and $52_3$ respectively a diode and $54_1$, $54_2$, $54_3$ are respectively a fixed resistor.

FIG. 34-A shows wave forms at each part of the circuit shown in FIG. 33, and pulse trains $v_R$ of constant number per second are always supplied with the reference oscillator R. When the ring counter $R_c$ is operated by the pulse train $v_R$, its out-puts $v_{R_1}$, $v_{R_2}$ and $v_{R_3}$ respectively set the flip-flop circuits $FF_1$, $FF_2$ and $FF_3$. On the other hand the flip-flop circuits $FF_1$, $FF_2$ and $FF_3$ are reset with the negative pulse $v_{f1'}$, $v_{f2'}$ and $v_{f3'}$ which is the differentiated out-put of the detecting means $H_1$, $H_2$ and $H_3$ for detecting the position ($v_{f1'}$ in FIG. 34-A is the output of the detecting means $H_1$), and the outputs $v_{f1}$, $v_{f2}$ and $v_{f3}$ of the flip-flop circuits $FF_1$, $FF_2$ and $FF_3$ having passed the AND-gate $AG_1$, $AG_2$ and $AG_3$ are changed into $v_{m1}$, $v_{m2}$ and $v_{m3}$ as shown in FIG. 34-A. In consequence, the summary of the driving electric currents which run through the driving coils $L_1$, $L_2$ and $L_3$ becomes $v_m$ as shown in FIG. 34-A. The rotation speed of the motor becomes almost constant after t becomes larger than $T_{No}$ ($t \geq T_{No}$) as shown in FIG. 34-B, whereby $T_{No}$ is the time point when the rotation speed of the motor reaches a synchronized speed No.

In short after t which is larger than $T_{No}(t \geq T_{No})$, the electric currents which run through the driving coils $L_1$, $L_2$ and $L_3$ start to run at the time synchronized with the signal $v_R$ of the reference oscillator and is cut in a synchronized manner at the time corresponding to the angle of rotation of the rotor 55.

Figure 35:
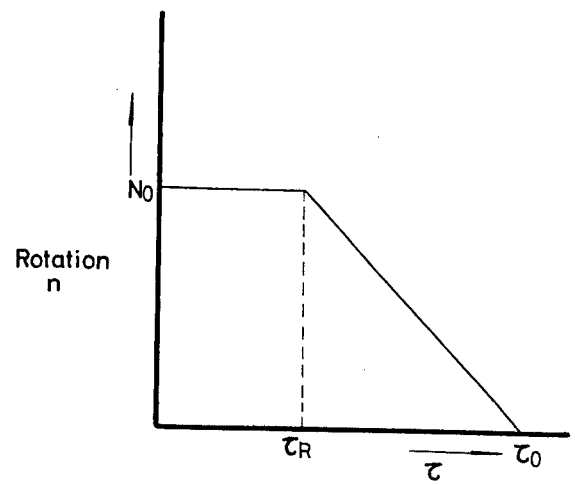
FIG. 35 is a graph showing the relation between the torque- and the rotation speed of the motor shown in FIG. 33.

FIG. 35 shows the torque-rotation speed characteristics of the D.C. synchronous motor according to the present invention, whereby it is shown that the rotation speed is a constant value $N_o$ with reference to the variation in the torque when the torque is between zero and $\tau_R$. Hereby $\tau_o$ is the starting torque.

As mentioned above according to the fourth embodiment it is constructed in such a manner that the control of the electric currents which runs through the driving coils is carried out by the out-put signal of a separate reference oscillator outside of the electric motor as well as the signal corresponding to the angle of rotation of the rotor, so that the driving currents are synchronized with both of the above-mentioned signals when the electric motor runs at a constant speed and further no fluctuation takes place contrary to the conventional synchronous electric motor and no variation in the rotation speed takes place with reference to the load contrary to the conventional direct current motor.

In the fifth embodiment shown in FIG. 36, R is a standard reference oscillator, 4 is a frequency generator to produce a frequency signal being proportional to the rotation speed of a motor 2, $FF_1'$, $FF_2'$ and $FF_3'$ respectively a flip-flop circuit, $AG_{I_1}$, $AG_{I_2}$, $AG_{R_1}$, $AG_{R_2}$ respectively a AND-gate connecting the flip-flop circuit $FF_1'$-$FF_3'$, whereby to the gates $AG_{I_1}$ and $AG_{I_2}$ the out-put of the frequency generation 4 and the set signals of the flip-flop circuits of the preceeding steps are given as in-put, while to the gates $AG_{R_1}$ and $AG_{R_2}$ the out-put of the standard reference oscillator R and the set signals of the flip-flop circuits of the preceeding steps are given as in-put. $29_1$-$29_3$ are respectively a switching transistor, whereby they are connected in parallel to each other and in series with the direct current motor 2. 56 and 57 are respectively a resistor inserted in the collector circuit of the transistor $29_2$ respectively $29_1$, 1 the electric source, and 13 the switch for the electric source 1. The provision of the resistors 56 and 57 and the selection of the resistances of the resistors 56 and 57 gives a very fine speed control to the fifth embodiment.

FIG. 37-A shows wave forms of the signals at each part of the electric circuit in FIG. 36. When the switch 13 for the electric source 1 is opened, the out-put signal $v_1$ of the frequency generator 4 is zero while only the standard reference oscillator R produces the out-put signal $v_R$, so that all the out-put terminals for $A_1$-$A_3$, of the flip-flop circuit $FF_1'$-$FF_3'$ are at positive potentials and the transistors $29_1$-$29_3$ are switched on. In consequence the direct current motor 2 start to rotate immediately when the switch 13 for the electric source 1 is closed.

Now let us suppose that the number of frequency of the standard reference oscillator R be $f_G$, and that of the frequency generator 4 be $f_M$. When $f_M$ for $v_1$ is smaller than $f_G$ for $v_R$ ($f_M < f_G$), the out-put terminals for $A_2$ and $A_3$ of the flip-flop circuits $FF_2'$ and $FF_3'$ are positive as shown at the time point $T_{No1}$ in FIG. 37-A.

In short to the flip-flop circuit $FF_2'$ either move than two out-put pulses of the frequency generator 4 are given as in-put signals during one cycle of the out-put of the standard reference oscillator R or more than two out-put pulses of the standard reference oscillator R and given as in-put signals during one cycle of the out-put of the frequency generator 4, so that the out-put terminals are kept in positive states while $f_M$ is smaller than $f_G$ ($f_M < f_G$).

When $f_M$ becomes larger than $f_G$ ($f_M > f_G$), the out-put terminal for $A_2$ of the flip-flop circuit $FF_2'$ is switched off as shown at the time point $T_{No2}$ in FIG. 37-A. Then the out-put terminal $A_3$ of the flip-flop circuit $FF_3'$ is also switched off as shown at the time point $T_{No3}$ in FIG. 2. In consequence the transistors $29_2$ and $29_3$ are switched off and the driving current limited by the resistor 57 through the transistor $29_1$ is supplied to the motor 2 so that the motor 2 is deccelarated. Thus $f_M$ becomes equal to $f_G$ ($f_M = f_G$) when the motor 2 matches the load, and the motor 2 continues to run, being synchronized with the out-put of the outer oscillator R.

The torque rotation speed characteristics of a motor shows that within a certain range of torque the rotation speed is constant regardless of the charge of or variation in the torque. By means of the fifth embodiment according to the present invention a conventional direct current motor works and functions with high efficiency and precision as if the motor is a synchronous motor, with the outer signal and with the direct current source, which becomes quite useful for the industry.

The Starting and Running characteristics of the fifth embodiment shown in FIG. 37-B will be understood from the above description, referring to the characteristics shown in FIG. 34-B for the fourth embodiment.

In summary the present invention gives a control system having a bistable multivibrator with its in-put of an A.C. biased construction. The first, fourth and fifth embodiment comprises a flip-flop circuit, so that an A.C. biased in-put should be of rectilinear or steady wave form; while the 2nd and third embodiment comprises a Schmitt circuit, so that an A.C. biased in-put may be of non-rectilinear or transient wave form. The A.C. biased or pulse biased in-put may be in-put at any plural terminals of the bistable multivibrator separately or may be in-put at a single certain terminal of the bistable multivibrator after mixing.

What is claimed is:

1. A control system for an electric motor, comprising a bistable multivibrator coupled to the motor and having an output corresponding to the speed of the motor, a monostable multivibrator producing one pulse having a predetermined constant time period in each cycle, the time period being related to the desired speed of the motor, trigger means for triggering said monostable multivibrator in response to the output of said bistable multivibrator, an AND gate responsive to said monostable multivibrator and said bistable multivibrator, a flip-flop set in response to said AND gate and reset in response to said bistable multivibrator, and driving means responsive to the output of said flip-flop circuit and coupled to the motor for controlling the speed of the motor.

2. A control system for driving an electric motor at a predetermined rotational speed, comprising a power source for driving the electric motor, switching means connected between the motor and the power source for applying discontinuous pulse driving currents thereto from the power source, the motor and switching means being connected in series with the power source, tacho-generator means for producing an output corresponding to the rotational speed of the motor, analog-to-digital transforming means responsive to said tacho-generator means and coupled with said switching means for transforming an analog signal of the output of said tacho-generator means to digital signals to cause said switching means to discontinuously switch current from said power source to the motor so as to maintain the electric motor at a desired rotational speed wherein said analog-to-digital transforming means including a shaper circuit for producing square waves from said tacho-generator means, a bistable circuit responsive to the output of said shaper circuit, a monostable circuit responsive to said bistable circuit so as to be synchronized therewith and producing pulses in each cycle having a constant time period, a second bistable circuit for producing a substantially constant output when the cyclical period of the output of said first bistable circuit is less than a predetermined relation to the constant time period and for producing an asymmetrical pulse output when the cyclical period at the output of said first bistable circuit is greater than the constant time period.

3. A system as in claim 2, wherein said switching means includes a drive switching portion and a brake switching portion, said drive switching portion being connected to said motor so as to drive the motor when said drive switching portion is actuated and said brake switching portion being connected to brake the motor when said brake switching portion is actuated, said brake switching portion being connected to said analog-to-digital transforming means so as to respond alternately to different levels of the output of said analog-to-digital transforming means.

4. A system as in claim 3, wherein said drive switching portion and said brake switching portion each includes respective transmitters of opposite conductivities.

5. A control system for driving an electric motor at a given rotational speed, comprising an electric power source for driving the motor, switching means for applying discontinuous pulses to the electric motor and said switching means being connected in series with said power source, signal generating means having an output corresponding to the rotational speed of the electric motor, oscillating circuit means coupled with said signal generator means for producing pulse signals in response thereto, and a Schmitt-circuit responsive to the pulse signals and said signal generating means and connected to said switching means for digitally controlling said switching means.

6. A system as in claim 5, wherein the amplitude of pulses derived from said oscillating means are nearly equivalent to the threshold value of hysteresis of the input of said Schmitt-circuit.

7. A control system for driving an electric motor at a predetermined rotational speed, comprising a power source for driving the electric motor, control means coupled to the motor for producing a signal having a first component corresponding to the rotational speed of the motor and a second component having a frequency higher than the frequency of the first component, analog-to-digital transforming means responsive to said control means and connected between the motor and the power source for applying discontinuous pulse-driving current to the motor from the power source, said control means including generator means coupled to the motor for producing the component corresponding to the rotational speed of the motor, said analog-to-digital transforming means including a Schmitt circuit having hysteresis and responsive to both components, the hysteresis of said Schmitt circuit defining a voltage range at the limits of which the Schmitt circuit is reversed, said second component having an absolute value equal to the range.

8. A control system for driving an electric motor at a predetermined rotational speed, comprising a power source for driving the motor, a first switching means connected between the motor and the power source for applying discontinuous pulse-driving currents thereto from the power source, control means coupled to the motor for producing a signal having a first component corresponding to the rotational speed of the motor and a second component having a frequency higher than the frequency of the first component, a second switching means which has a predetermined level of inversion connected between said control means and said first switching means and detects signal of said control means, said second switching means being inverted when the signal reaches a predetermined value and causing said first switching means to discontinuously switch current from said power source to the motor so as to maintain the electric motor at at a desired rotational speed, said control means including generator means coupled to the motor for producing the component corresponding to the rotational speed of the motor, said second switching means including a Schmitt circuit having hysteresis and responsive to both components, the hysteresis of said Schmitt circuit defining a voltage range at the limits of which the Schmitt circuit is reversed, said second component having an absolute value equal to the range so as to remove said hysteresis of said Schmitt circuit.

9. A system as in claim 8, wherein said generator means forms said second component.

10. A system as in claim 8, wherein said control means includes alternating current source means for forming the second component and superimposing said second component of said first component.

11. A system as in claim 8, wherein said control means includes pulse-forming means for superimposing pulses on the first component.

12. A system as in claim 8, wherein the hysteresis defines a voltage range at the limits of which the Schmitt trigger is reversed, the second component having an absolute value greater than the range.

13. A system as in claim 8, wherein the hysteresis defines a voltage range at the limits of which the Schmitt circuit is reversed, the second component having an absolute value less than the range.

14. A system as in claim 8, wherein the hysteresis defines a voltage range, and wherein the second component is sufficiently large to reverse the Schmitt circuit in one direction when the first component is in one part of the range and to reverse the Schmitt circuit in the other direction when the first component is in another part of the range.

15. A control system for driving an electric motor at a predetermined rotational speed, comprising a power source for driving the electric motor, a first switching means connected between the motor and the power source for applying discontinuous pulse-driving currents thereto from the power source, control means coupled to the motor for producing a first signal corresponding to the rotational speed of the motor; pulse-generating means for producing a second signal having a frequency higher than the frequency of the first signal, a second switching means which is connected between said first switching means and said control means and to pulse-generating means said second switching means corresponding to the multiple signal of said first signal and second signal and inversed when the multiple signal reaches a predetermined value and causing the switching of said first switching means so as to flow the current discontinuously from said power source to said motor and maintain said motor at a desired rotational speed, said control means including generator means coupled to the motor for producing said first signal corresponding to the rotational speed of the motor, said second switching means including a Schmitt circuit having hysteresis and responsive to said multiple signal, the hysteresis of said Schmitt circuit defining a voltage range at the limits of which the Schmitt circuit is reversed, said second signal having an absolute value equal to the range so as to remove said hysteresis of said Schmitt circuit.

* * * * *